(12) United States Patent
Donohoe et al.

(10) Patent No.: US 6,401,092 B1
(45) Date of Patent: Jun. 4, 2002

(54) NAME TYPE VALUE STORAGE

(75) Inventors: J. Douglas Donohoe, Menlo Park; Samuel R. Neth, Mountain View; Young Barry Kim, San Francisco; Brian D. Zak, Redwood City, all of CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/161,329

(22) Filed: Sep. 25, 1998

(51) Int. Cl.[7] ............................................. G06F 17/30
(52) U.S. Cl. ............................................. 707/10
(58) Field of Search ................... 707/516, 10; 709/203

(56) References Cited

U.S. PATENT DOCUMENTS

| | | | |
|---|---|---|---|
| 5,278,978 A | * 1/1994 | Demers et al. | 395/600 |
| 5,666,553 A | * 9/1997 | Crozier | 395/803 |
| 5,680,586 A | * 10/1997 | Elkins et al. | 395/500 |
| 5,680,616 A | * 10/1997 | Williams et al. | 395/614 |
| 6,122,649 A | * 9/2000 | Kanerva et al. | 707/516 |

OTHER PUBLICATIONS

Michael Morrison, et al., Java1.1 Third Edition, 1997, Sams.net Publishing, pp.: 53,57,79–81,111,277–279,395–399,457, 486–490,747,1338,1334–1335 Chapters:7, 31.*
Robert Lafore, Object–Oriented Programming in Turbo C++, 1991, Waite Group Press, p. 289–291,452–455.*

* cited by examiner

*Primary Examiner*—John Breene
*Assistant Examiner*—Susan Rayyan
(74) *Attorney, Agent, or Firm*—Michael A. Glenn; Kirk Wong

(57) ABSTRACT

Name Type Value Storage ("NTV") provides a very flexible technique for storing data for use in the Internet and in World Wide Web based applications. NTV provides a list of values or names, referred to as triplets, that is used to identify a correspondence. In the triplet, NTV provides both an identifier and a name of a type, where a type can be one of several things, e.g. a type can be an integer, a floating point number, a string, an array of any of those values, or an another NTV object. A third part of the triplet is the actual value itself, which is stored in its native type.

44 Claims, 6 Drawing Sheets

NAME TYPE VALUE STORAGE

BACKGROUND OF THE INVENTION

1. Technical Field

The invention relates to the storage of information for use in Internet and World Wide Web ("Web") based applications. More particularly, the invention relates to storing data in name-type-value triplets.

2. Description of the Prior Art

First generation World Wide Web ("Web") applications are referenced by CGI (common gateway interface), in which a form is submitted from a Web page, where the data elements in the form are represented by a name of an element and a corresponding user entered value, i.e. as a name-value pair. This value could be a value from a list or a hand typed value. FIG. 1 is a schematic representation of a Web page 10 which provides a form into which data may be entered by a user. Various fields 11–13 are provided to receives such data, e.g. city, state, and zip code. The entered data correspond to name-value pairs 11a–13a in a name-value list. It can be seen that the data may be hand entered, as for city or zip code, or that the user may select the data from a list, as for state. It is always necessary to use lists of values of this type when writing Web applications. Over time it was gradually realized that the use of lists of values provides a very powerful way to represent data because one of the typical ways in which data are passed from one computer application to another is through a predefined set of values. For example, if it was desired to create a new customer account, it would be necessary to know that it is required to pass such information as, e.g. a name, address, city, and state, in a defined list of values with known types (see FIG. 1).

One of the limitations of this approach is presented when one wants to change the application program interface ("API") for the underlying application program or system platform. Such activity is a very cumbersome process because it is necessary to find every place in a document or application that the API was called, where the value for the source API is no longer valid for the target API. That is , it is necessary to provide an additional value because the target API expects a different value than that of the source API.

It would be advantageous to provide a technique that allowed a list of values to contain any type of information desired. It would be further advantageous if such list of values could be readily used across various system platforms without regard to an underlying API.

SUMMARY OF THE INVENTION

The invention provides a feature referred to as Name Type Value storage ("NTV"). This feature provides a very flexible technique for storing data for use, for example in the Internet and in World Wide Web based applications. NTV storage is an extension of the familiar and powerful concept of storing data in name-value pairs, but with several significant enhancements. For example, one advantage of NTV is that values are stored in their native types, so that they can be manipulated without costly and inconvenient parsing and validation.

The preferred embodiment of NTV provides a list of values or names, referred to as triplets. In each triplet, NTV provides both an identifier and a name of a type, where a type can be one of several things, e.g. a type can be an integer, a floating point number, a string, an array of values, or another NTV object. NTV allows one to nest the various types. A third part of the triplet is the actual value itself, which is stored in its native type.

DETAILED DESCRIPTION OF THE INVENTION

The invention provides a feature referred to as Name Type Value storage ("NTV"). This feature provides a very flexible technique for storing data for use, for example in the Internet and in World Wide Web based applications. NTV storage is an extension of the familiar and powerful concept of storing data in name-value pairs, but with several significant enhancements. For example, one advantage of NTV is that values are stored in their native types, so that they can be manipulated without costly and inconvenient parsing and validation.

Figure 1:
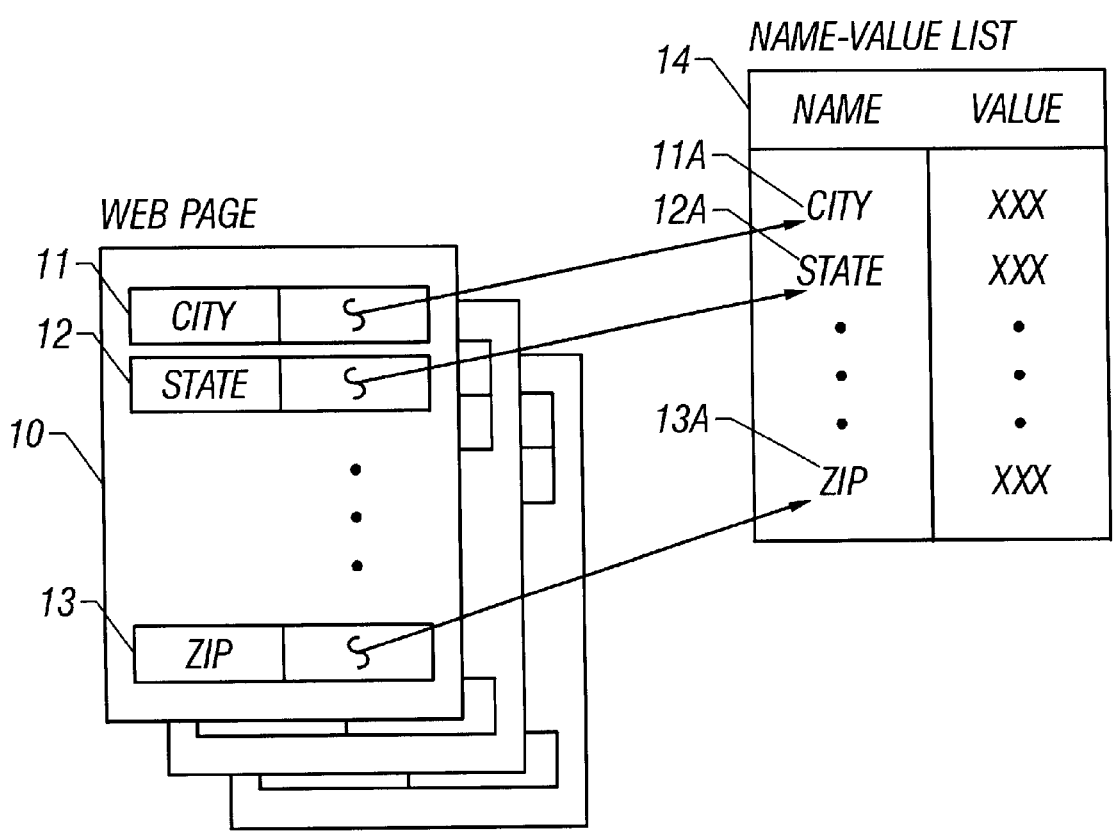
FIG. 1 is a schematic diagram of a Web page showing a list of name-value pairs.
Figure 2:
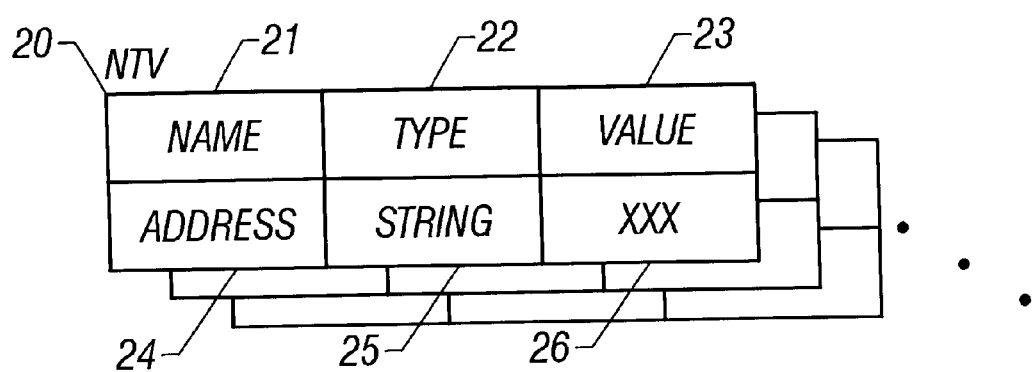
FIG. 2 is a schematic diagram showing a list of name-type value triplets according to the invention.

NTV provides a list of values or names, referred to as triplets. FIG. 2 is a schematic diagram of an NTV triplet 20, showing a name field 21, a type filed 22, and a value field 23. In each triplet, NTV provides both an identifier and a name of a type, where a type can be one of several things, e.g. a type can be an integer, a floating point number, a string, an array of values, or an another NTV object. NTV allows one to nest the various types. A third part of the triplet is the actual value itself, which is stored in its native type. In FIG. 2, the name field 21 describes the triplet as containing an address 24, the type of data within the triplet, described by the type field 22, is a string 25, and the value 26 is contained in the value field.

For purposes of the discussion herein, native type refers to the internal storage format of the resident platform. An integer such as the number five can either be stored the way the computer actually represents five or in a platform independent fashion, for example, as the ASCII value five. In many Web applications, ASCII characters are sent from a Web browser to the server because of cross platform issues, e.g. going from a MAC, to a UNIX machine, to a VMS machine. In this case, the Web browser represents the characters as ASCII because ASCII provides essentially the same effect as if the various systems were the same platform.

However, representing such characters internally as ASCII results in a performance penalty because it becomes necessary to convert from the string representation of the character to the internal representation of the character if such operations as computations and comparisons are to be performed. One of the improvements provided by NTV is the ability to store characters in the value portion of the triplet, for example, internally as the characters' internal value so that the best performance is available. As discussed above, the triplet includes name, type, and value information.

There are certain advantages that are provided by representing the data in this way. One such advantage is that it is possible to represent the data on any platform because the "type" of data is identified to the target platform by the triplet. This allows the use of multiple platforms and any programming language, e.g. a Java representation, a C++ representation, or a Java Script representation. It is therefore possible to send a group of data, e.g. an object referred to as "customer" which represents an individual and all information related to that individual, as a list of triplets (i.e. an NTV data structure) and to manipulate that data in a C++ program which is on a server. Using NTV, it is thereafter possible to change that data, e.g. send the data to a Java application where one can, for example change the values, write the data into a report, or place the data into a JavaScript application where one can perform some manipulation on the data. The data are the same representation in all ways on all three platforms and, if it is desired to add a fourth platform or language, such as a Perl or Pascal, the data are common among each platform, such that the development process is sped up.

Another feature of NTV is that it is a self describing format. Thus, one NTV data structure can serialize itself into a string (e.g. in ASCII format), which allows one to save it to a file or send it across a wire, where it may be reconstituted at the other end. The data has one format when it is at a first location, but it can be turned into a string which then can be transmitted, and it can reassemble itself at the other end in the proper format, i.e. exactly the same format and the same structure. Therefore, if one decides to add a new value into a data structure that is being sent back and forth between various platforms, it is not necessary to change the data structure itself. That is, one does not have to add a field to a header file or recompile all of the code. Rather, one can add the new value and the new value passes through to the destination platform.

Figure 3:
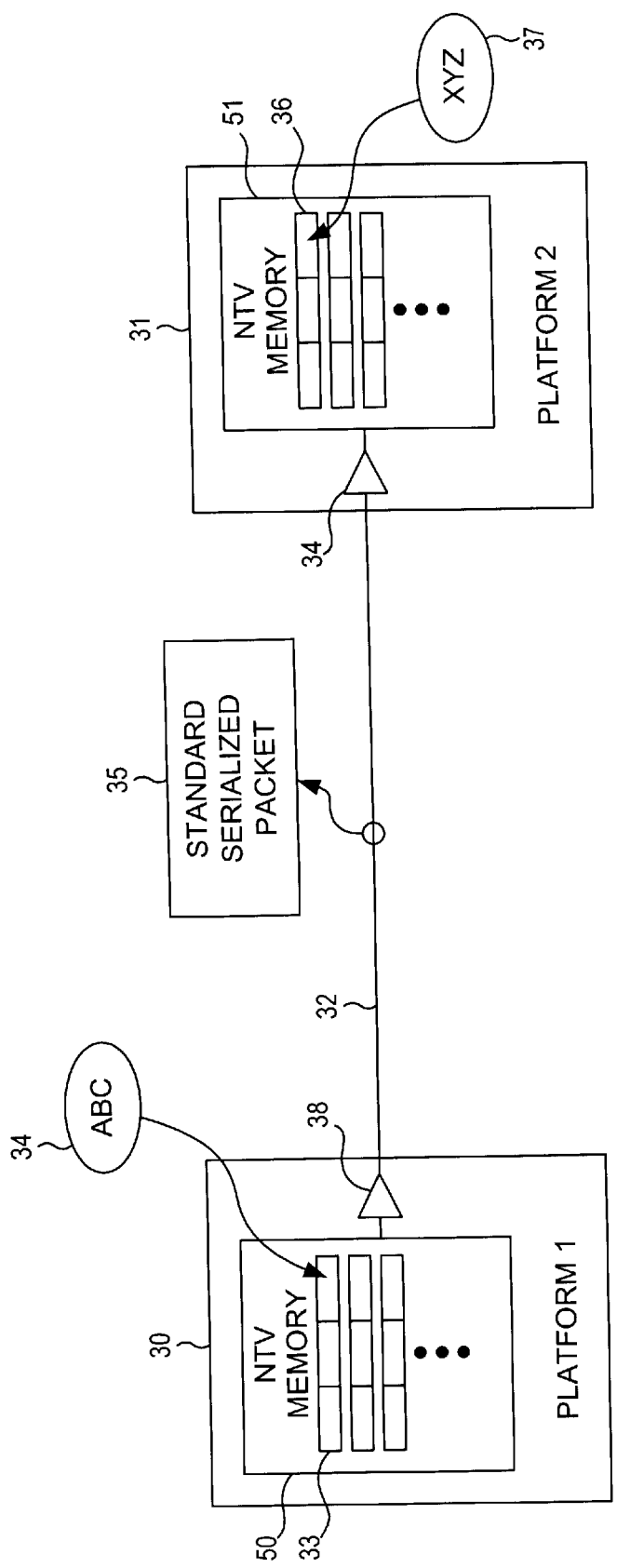
FIG. 3 is a schematic diagram showing multiple platforms that are interconnected over a network according to the invention.

For example, FIG. 3 provides a schematic diagram showing multiple platforms 30, 31 that are interconnected over a network 32. An NTV data structure 33 stored in memory 50 includes one or more triplets, one of which has a value containing data "abc" 34 in a native format for a source platform 30. A module 38 is provided at the source platform (platform 1) 30 that serializes the triplet and sends the triplet over the network. 32, in a serialized format 35. A module 39 is provided at a second platform (platform 2) 31. That receives the serialized data and converts the data back to an NTV data structure 36 that includes the same triplet, but where the type of data indicated by the triplet was used to convert the serialized form of the data to a value "xyz" in a native format for the recipient platform 31. The native triplet is then stored in memory 51 at the second platform.

Base data types supported by the presently preferred embodiment of NTV are shown in Table 1 below. It should be appreciated that the invention is readily applicable to other base data types through the exercise of ordinary skill in the art.

TABLE 1

NTV Base Data Types

| | Native Type C++ | Java |
|---|---|---|
| NTV Int | (4 byte integers) | int |
| NTV Double | (Double precision floating point) | double |

TABLE 1-continued

NTV Base Data Types

| | Native Type C++ | Java |
|---|---|---|
| NTV String | (RWCString) | String |
| NTV Boolean | (int) | boolean |
| NTV DateTime | (RWDBDateTime) | Date |

Figure 4:
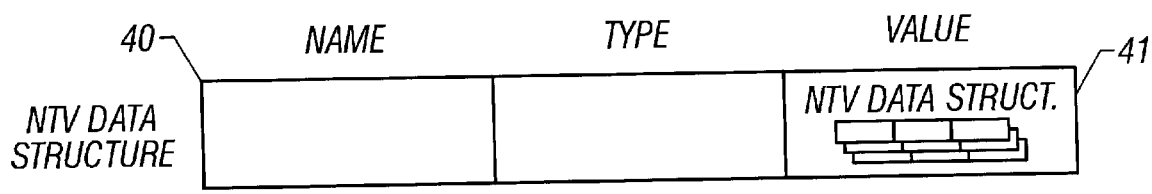
FIG. 4 is a schematic diagram showing an NTV data structure embedded in the value field of another NTV data structure according to the invention.
Figure 5:
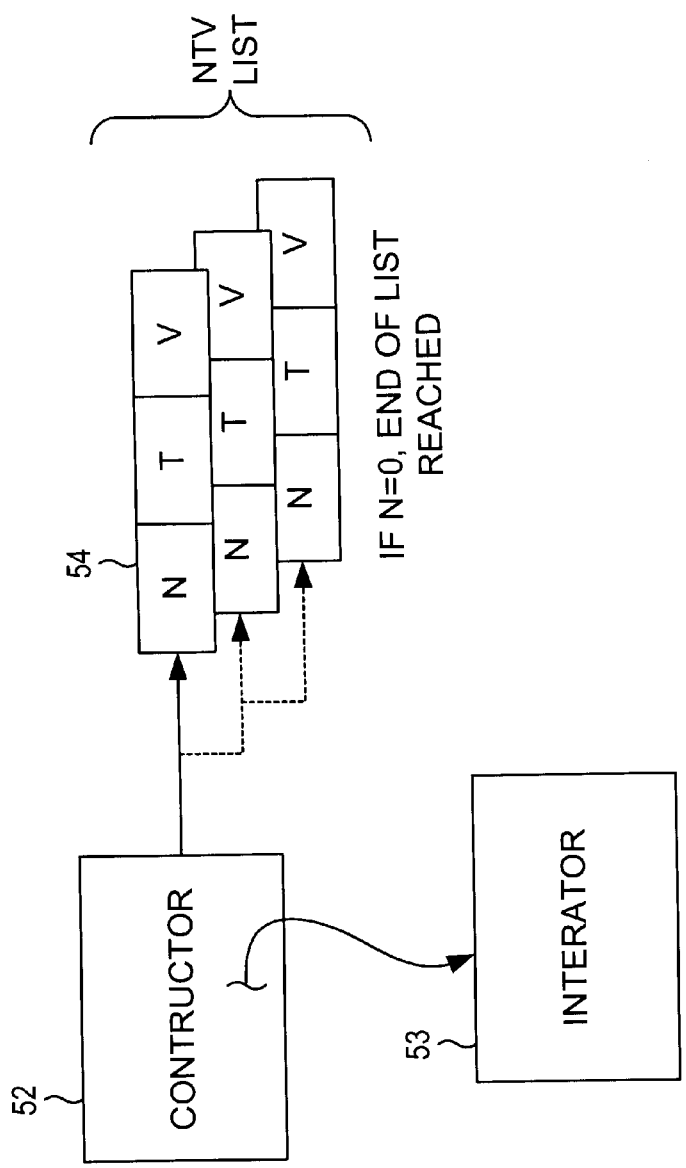
FIG. 5 is a schematic diagram showing iterator construction according to the invention.

Some other advantages of NTV include:

NTV lists can be embedded within each other, allowing data structures of unlimited complexity to be constructed (see FIG. 4, which shows an NTV data structure 41 embedded in the value field of another NTV data structure 40).

Arrays of any supported type may be stored as values in NTV lists, including arrays of NTV lists.

NTV lists and the array value types support several iterator interfaces.

NTV lists can be serialized and deserialized simply, allowing any data structure to be stored in a file and reconstituted later, or for data structures to be transmitted between application components without specialized code.

NTV lists have a uniform structure, such that reflecting data structures into JavaScript, or exchanging data structures between C++ and Java does not require header files, class loaders, or object classes.

Using NTV

Most operations that are performed on NTV lists involve the setting and getting of values. The application program interface (API) functions used to do this are specialized to the type of data being handled, so that data may be passed in and out of an NTV list as the appropriate native type.

Set Functions. The ACNTVList methods used to set a value into an NTV list are typically as follows:

ACNTVList::set<TypeSpecifier>(String<name>, NativeType<value>[, ACNTVError<error object>]);

The parameters to these functions are the name with which the inserted value should be associated, the value to insert (as the correct native type), and an optional error object that is populated with a return condition code, if appropriate.

Dot Notation. NTV permits a name that is located several levels into the NTV list hierarchy to be specified by using dot notation. For example, if an NTV list contains another NTV list having the name "a" which, in turn, contains an integer having the name "b," then the value of "b" could be changed to zero by calling setInt("a.b", 0) on the parent NTV list. If the NTV lists that are required to store a value with a dot notated name do not exist, they are created automatically. In other words, if a call is made to setInt ("a.b", 0) on an empty NTV list, the NTV list having the name "a" is first inserted into the parent NTV list, and the integer having the name "b" is then inserted. This is a powerful feature, but it does incur a performance penalty, e.g. if a nested NTV list is accessed repeatedly, it is preferred to get a pointer directly to the embedded list.

Restrictions on Names. Note that providing the dot notation feature makes it impossible to embed a dot in a name in an NTV list. If it is desired to use dot notation to access an NTV data structure from JavaScript, it is necessary that all inserted names are valid JavaScript identifiers. Memory Management. All values except Void types are copied into the NTVList. This feature of NTV has several implications:

First, it is necessary to provide a function that frees the memory occupied by the value passed in because the NTV list does not perform this function. On the other hand, it is not necessary that the NTV list modify any variable used to set a value.

Second, if an NTV list is inserted into another NTV list, then the entire inserted list is copied. This can be an expensive operation, so it is often better, if possible, to build the nested list in place. This involves inserting a new (empty) list, calling getNTVList to retrieve a pointer to the list in place, and using that pointer to create the list's contents. Note that the same procedure applies for array types.

If a value of any type exists in the NTV list before the function is called, it is replaced with the new name-type-value triplet. In general, any memory associated with the replaced value is freed. The exception to this rule is Void types in C++. Note that while the Void objects in a Void array are not freed, the memory occupied by the array itself is freed.

DateTimes and Booleans. Unlike other types, DateTimes can be inserted into NTVs using a number of different APIs. A first set of APIs allow values to be inserted using a native DateTime representation. Another set of APIs allow DateTimes to be inserted using a string and a corresponding format that describes the value. This format is constructed using various characters as described in Table 3.

Regardless of how DateTimes are set, they are stored internally in native format. If the values are inserted as strings, the resulting native value is created using the local time zone of the machine on which the application is running. This conversion takes into account all time zone offset information-including. Daylight Savings Time.

Boolean operators also provide an interface that is somewhat different than most types. In addition to the normal ability to insert values using a native type, Boolean operators may also be inserted using case insensitive versions of the strings "true" and "false." Regardless of how Boolean operators are inserted, they are stored internally (and therefore extracted) in native format.

Classes for NTV data structures are discussed below. C++ Prototypes. Table 2 below lists set function prototypes.

TABLE 2

Set Function Prototypes

Set Function Prototypes void setInt (const RWCString& rrwcsName, const int iValue, ACNTVError& errval = ACNTVError());
void setDbl (const RWCString& rrwcsName, const double dValue, ACNTVError& errval = ACNTVError());
void setStr (const RWCString& rrwcsName, const RWCString& rrwcsValue, ACNTVError& errval = ACNTVError());
void setBool(const RWCString& rrwcsName, const int iValue, ACNTVError& errval = ACNTVError());
void setBool(const RWCString& rrwcsName, const RWCString& rrwcsValue, ACNTVError& errval = ACNTVError());
void setBool(const RWCString& rrwcsName, const char* pszValue, ACNTVError& errval = ACNTVError());
void setDateTime(const RWCString& rrwcsName, const RWDate& rrwdtValue,ACNTVError& errval = ACNTVError());
void setDateTime(const RWCString& rrwcsName, const RWTime& rrwdtValue,ACNTVError& errval = ACNTVError());
void setDateTime(const RWCString& rrwcsName, const RWDBDateTime& rrwdtValue, ACNTVError& errval = ACNTVError());
void setDateTime(const RWCString& rrwcsName, const char* pszValue, const char* pszFormat = DATETIME_SERIALIZE_FMT, ACNTVError& errval = ACNTVError());
void setDateTime(const RWCString& rrwcsName, const RWCString&

TABLE 2-continued

Set Function Prototypes

Set Function Prototypes rrwcsValue, const RWCString& rrwcsFormat = DATETIME_SERIALIZE_FMT,ACNTVError& errval = ACNTVError());
void setVoid (const RWCString& rrwcsName, VoidPtr pValue, ACNTVError& errval = ACNTVError());
void setAny (const RWCString& rrwcsName, const AnyObject*& pValue, ACNTVError& errval = ACNTVError());
void setNTVList (const RWCString& rrwcsName, const ACNTVList*& pntvValue, ACNTVError& errval = ACNTVError());
void setIntArr(const RWCString& rrwcsName, const ACNTVIntArr& array, ACNTVError& errval = ACNTVError());
void setDblArr(const RWCString& rrwcsName, const ACNTVDblArr& array, ACNTVError& errval = ACNTVError());
void setStrArr(const RWCString& rrwcsName, const ACNTVStrArr& array, ACNTVError& errval = ACNTVError());
void setVoidArr(const RWCString& rrwcsName, const ACNTVVoidArr& array, ACNTVError& errval = ACNTVError());
void setAnyArr(const RWCString& rrwcsName, const ACNTVAnyArr& array, ACNTVError& errval = ACNTVError());
void setNTVListArr(const RWCString& rrwcsName, const ACNTVListArr& array, ACNTVError& errval = ACNTVError());

Get Functions

NTVList methods used to get a value from an NTV list are typically as follows:

<NativeType>ACNTVList::get<Typespecifier> (String<name>, NativeType<default>[, ACNTVError<error object>]);

The parameters to these functions are the name associated with the desired value, an optional default value (in the correct native type), and an optional error object that is populated with a return condition code, if appropriate.

There is a special function in this group referred to as the getAsString( ) function, which has the same signature as getStr( ), but which converts the value to a string before returning it. This method works for all types other than arrays. For integers, doubles, and strings, the format of the resulting string value should be evident. Formats for other types are described in Table 3 below.

TABLE 3

Type Formats

| Native Value | String Format |
|---|---|
| NTV Boolean | true or false |
| NTV DateTime | An ISO DateTime string in the format YYYY-MM-DD hh:mm:ss+/-hhmm |

Default Values. The default value is returned unchanged if no value of the correct type is found in the list with the name supplied. If no default value is provided, these functions return an empty string, zero, or null, as appropriate to the type returned. Note that the get functions for array types do not support default values.

Special Considerations. The same dot notation feature and memory management considerations that apply to set methods also apply to get methods. In addition, it is important to note that where these methods return pointers, they point to the actual objects in the NTV list. This memory should not be freed by the caller.

C++ Prototypes. Table 4 below lists get function prototypes.

TABLE 4

Get Function Prototypes

Get Function Prototypes

RWCString getAsString(const RWCString& rrwcsName, const RWCString& prwcsDefault = "", ACNTVError& errval = ACNTVError()) const;
int getInt(const RWCString& rrwcsName, const int iDefault = 0, ACNTVError& errval = ACNTVError()) const;
double getDbl(const RWCString& rrwcsName, const double dDefault = 0.0, ACNTVError& errval = ACNTVError()) const;
RWCString getStr(const RWCString& rrwcsName, const RWCString& prwcsDefault = "", ACNTVError& errval = ACNTVError()) const;
int getBool(const RWCString& rrwcsName, const int iDefault = FALSE,ACNTVError& errval = ACNTVError()) const;
RWDate getDateTime(const RWCString& rrwdName, const RWDate& prwdDefault, ACNTVError& errval = ACNTVError()) const;
RWTime getDateTime(const RWCString& rrwdName, const RWTime& prwtDefault, ACNTVError& errval = ACNTVError()) const;
RWDBDateTimegetDateTime(const RWCString& rrwdName, const RWDBDateTime&prwdtDefault=
RWDBDateTime(ACValidate::minAllowedDate)
,ACNTVError& errval = ACNTVError()) const;
VoidPtr getVoid(const RWCString& rrwcsName, ACNTVError& errval = ACNTVError()) const;
AnyObject *getAny(const RWCString& rrwcsName, ACNTVError& errval = ACNTVError()) const;
ACNTVList *getNTVList(const RWCString& rrwcsName,ACNTVError& errval = ACNTVError()) const;
ACNTVIntArr *getIntArr(const RWCString& rrwcsName,ACNTVError& errval = ACNTVError());
ACNTVStrArr *getStrArr(const RWCString& rrwcsName,ACNTVError& errval = ACNTVError());
ACNTVDblArr *getDblArr(const RWCString& rrwcsName, ACNTVError& errval = ACNTVError());
ACNTVBoolArr *getBoolArr(const RWCString& rrwcsName, ACNTVError& errval = ACNTVError());
ACNTVDateTimeArr *getDateTimeArr(const RWCString& rrwcsName, ACNTVError& errval = ACNTVError());
ACNTVVoidArr *getVoidArr(const RWCString& rrwcsName, ACNTVError& errval = ACNTVError());
ACNTVAnyArr *getAnyArr(const RWCString& rrwcsName, ACNTVError& errval = ACNTVError());
ACNTVListArr *getNTVListArr(const RWCString& rrwcsName, ACNTVError& errval = ACNTVError());

Arrays

For each base type (Int, Double, String, Void, Any, and NTV list), there is a corresponding array type. These array types are not actually native arrays, but instead are objects which handle memory management and which, in the preferred embodiment of the invention, support a subset of the Java Vector API.

Array Object Methods. The interface for NTV array objects is based on the Java API class java.util.Vector. These methods provide everything required to manipulate an array, while concealing the underlying implementation. Note that some of the methods listed below require the ability to test for value equality, and are not available for arrays of Void or NTV lists. These methods are marked in Table 5 with an *.

The methods executed on Int, Double, and String arrays expect and return values/references, while the methods executed on Void, Any, and NTV list arrays are concerned with pointers, as with the get/set methods on ACNTVList. Also, as with ACNTVList, values are always copied on the way in, but never on the way out.

Detailed information on how these methods work follows the documentation for java.util.Vector or netscape.util.Vector. Note, however that for both of these classes, the lastIndexOf method is documented incorrectly: the search begins not at index, but at index −1. Also, the lastIndexOf method is implemented using value equality, rather than object identity, the way netscape.util.Vector does it, rather than the way that java.util.Vector does.

C++ Prototypes. Table 5 below lists array object methods.

TABLE 5

Array Object Method

Array Object Methods

*void addElement(const <Base Type> value);
*int contains(const <Base Type> value) const;
*<Base Type> elementAt(int index, ACNTVError& errval = ACNTVError()) const;
*int indexOf(const <Base Type> value, int index = 0) const;
*void insertElementAt(const <Base Type> value, int index, ACNTVError& errval = ACNTVError());
*int isEmpty () const;
*int lastIndexOf (const <Base Type> value, int index = −1) const;
*void removeAllElements ();
*int removeElement (const <Base Type> value);
*void removeElementAt (int index, ACNTVError& errval = ACNTVError());
*void setElementAt (const <Base Type> value, int index, ACNTVError& errval = ACNTVError());
*int size() const;

Iterators

There are currently two iterators provided by NTV, both of which support the same interface:

ACNTVListiterator is a fast iterator that does not provide a guarantee about order.

ACNTVListInsertionIterator is a slightly slower iterator that produces elements in the order in which they were inserted in the list.

Constructors

Figure 6:
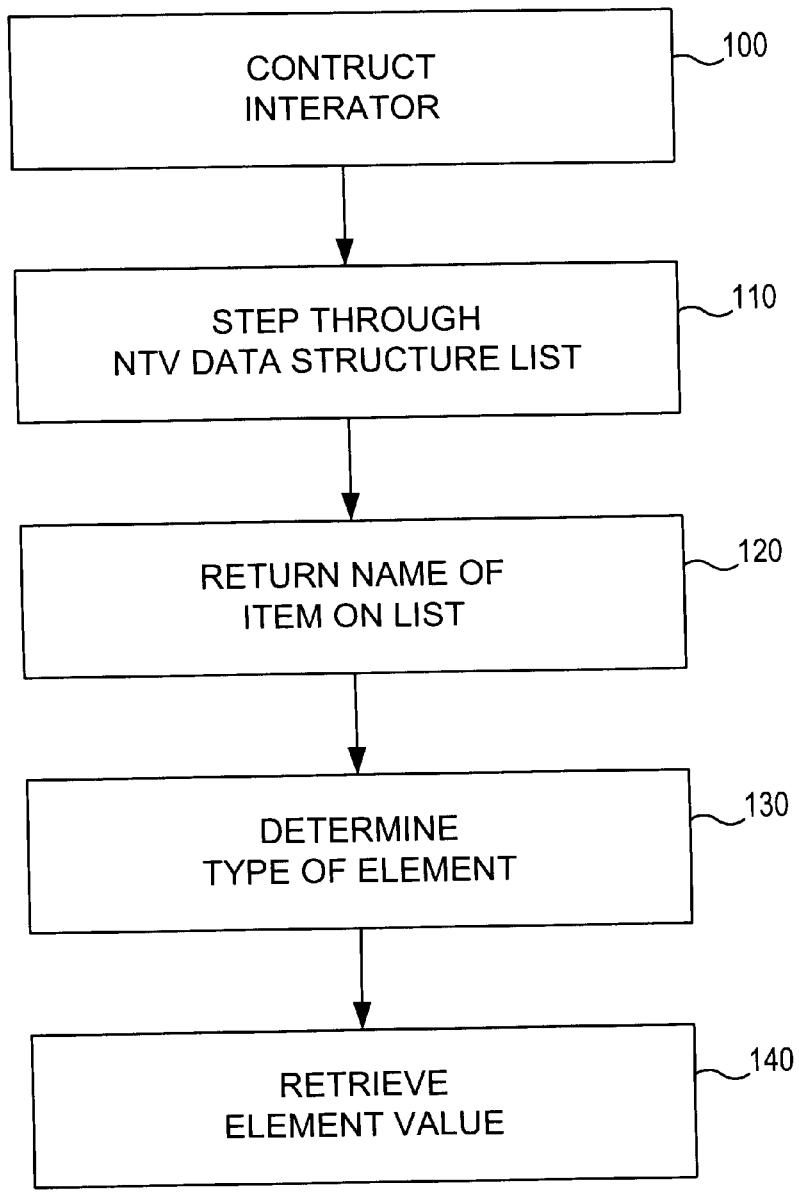
FIG. 6 is a flow diagram showing, in part, iterator construction, as well as NTV data structure list processing according to the invention.

A listing that includes a variable index, a constructor index, variables, and constructors for the presently preferred embodiment of the invention is attached hereto as Appendix "A, ". A listing that includes a variable index, a constructor index, variables, and constructors for the presently preferred embodiment of the invention is presented infra schematic diagram showing iterator construction according to the invention, while FIG. 6 is a flow diagram showing, in part, iterator construction, as well as NTV data structure list processing according to the invention. The iterator classes each have a single constructor 52 that takes a pointer to an NTV list 54 as a parameter. As with most iterator classes, iterators, the position of the iterator 53 is undefined immediately following its construction.

The constructors are as shown in Table 6 below.

TABLE 6

Constructors

Iterator Constructors

ACNTVListIterator(const ACNTVList* pntv);
ACNTVListInsertionIterator(const ACNTVList* pntv);

Stepping Through the List. After constructing an iterator (100), the system steps through the list (110) by calling the RWCString* next( ) method. This method returns the name of the item in the list (120). When next( ) returns null, the end of the list has been reached. The name of the current item may also be retrieved by calling the getName( ) method.

Determining the Type of an Element (130). To operate on the data in the list, the system calls the int getType( ) method and compares the result to the constants shown in Table 7 below, which are available as a result of including acntvlist.h.

TABLE 7

NTV Data Type IDs

NTV Data Type IDs

ACNTVIntClassID
ACNTVDblClassID
ACNTVStrClassID
ACNTVBoolClassID
ACNTVDateTimeClassID
ACNTVVoidClassID
ACNTVAnyClassID
ACNTVListClassID
ACNTVIntArrClassID
ACNTVDblArrClassID
ACNTVStrArrClassID
ACNTVBoolArrClassID
ACNTVDateTimeArrClassID
ACNTVVoidArrClassID
ACNTVAnyArrClassID
ACNTVListArrClassID Getting the Element Data After determining the type, one can retrieve the data (140) using get methods that function in manner similar to the corresponding methods on ACNTVList, except that they do not take any parameters because the name is already known and errors and misses should never happen.

C++ Prototypes. Table 8 below lists iterator get methods.

TABLE 8

Iterator Get Methods

Iterator Get Methods

RWCString getAsString( );
int getInt( );
double getDbl( );
RWCString getStr( );
int getBool( );
RWDBDateTime getDateTime( );
VoidPtr getVoid( );
AnyObject* getAny( );
ACNTVList* getNTVList( );
ACNTVIntArr* getIntArr( );
ACNTVDblArr* getDblArr( );
ACNTVStrArr* getStrArr( );
ACNTVBOOlArr* getBoolArr( );
ACNTVDateTimeArr* getDateTimeArr( );
ACNTVVoidArr* getVoidArr( );
ACNTVAnyArr* getAnyArr( );
ACNTVListArr* getNtvListArr( );

The iterators also support one other get method, i.e. ACNTVTriplet* getTriplet( ). This method returns the triplet used internally to store the data. One should avoid using this method if at all possible because it creates a dependency on the internal representation of NTV and is rarely necessary. Preferably, one can make full use of NTV without manipulating triplets directly.

Other Methods. The iterator classes also support a reset( ) method which restores the state that the iterator had immediately after construction.

Special Considerations. Note that the behavior of the iterator classes is undefined if the underlying list is modified after the iterator is constructed. of the inserted object are copied. This can be a computationally expensive operation. Accordingly, it is better to insert the object first, then fill the NTV list with data. In this case, the empty object insert is copied. To add data to the empty object insert, the appropriate get function is called to get a pointer to the new copy in the list. If data are added to the original object inserted, the data do not affect the contents of the parent list.

Support for "Any" Objects

There is a base class or interface that allows new classes to be created that are not in any way based on NTV lists, but that implement a core set of functions required to allow instances to be used as data values in NTV lists. In the current implementation, ACNTVAny should be implemented as an interface in Java.

Other Embodiments

The following provides a list of features that may be employed in other embodiments of the invention:

Type Methods on Iterator Classes. NTV provides type-specific methods such as isStr( ), isNTVList( ), and general type methods such as isArro or isNumber( ) which make the iterators easier to use.

getAsLocalizedString Methods. This method allows values to be retrieved as strings, as with getAsString, taking into account, e.g. locale-specific number and date formatting. This method is available from both NTV lists and iterators.

Internal Reference Counting. This feature avoids unnecessary internal copying that affects performance.

Case Insensitive Searching. This feature allows one to look a name up without paying attention to case.

Support Multi-Byte Strings. RWCString can be replaced with a new class that supports multi-byte.

Use Hash tables. NTV lists currently use binary trees.

Overload Functions to take char*. This feature alleviates the need for so many casts to avoid compiler warnings, and prevents unnecessary calling of RWCString constructors.

Constructor and Method Prototypes

Listed herein are the Constructor and Method Prototypes utilized in the preferred embodiment of the present invention. Table 9 defines variable types. Table 10 enumerates constructors. Table 11 presents a list of methods. Table 12 lists additional variable types. Table 13 lists the constructors methods and Table 14 presents the method prototypes.

TABLE 9

Variable Index list
listNames
ACNTVAnyArrClassID
ACNTVAnyClassID
ACNTVDblArrClassID
ACNTVDblClassID
ACNTVIntArrClassID
ACNTVIntClassID
ACNTVListArrClassID
ACNTVListClassID
ACNTVNtvlClassID
ACNTVRealNTVListClassID
ACNTVStrArrClassID
ACNTVStrClassID
ACNTVTripletClassID
ACNTVVoidArrClassID
ACNTVVoidClassID

TABLE 10

Constructor Index

| | |
|---|---|
| ACNTVList( ) | Constructs an empty ACNTVList object |
| ACNTVList(ACNTVList) | Constructs an ACNTVList object based on another ACNTVList object |

TABLE 11

Method Index

| | |
|---|---|
| ACNTVgetAnyArr (String) | Returns from this ACNTVList an ACNTVAnyArr named by argument name. |
| ACNTVgetAnyArr (String, ACNTVError) | Returns from this ACNTVList an ACNTVAnyArr named by argument name. |
| ACNTVgetVoidArr (String) | Returns from this ACNTVList an ACNTVVoidArr named by argument name. |
| ACNTVgetVoidArr (String, ACNTVError) | Returns from this ACNTVList an ACNTVVoidArr named by argument name. |
| CastToNTVList () | Safe downcast from ACNTVTriplet to ACNTVList |
| Clear() | Removes all elements from this ACNTVList. |
| clear(ACNTVError) | Removes all elements from this ACNTVList. |
| cloneNTVList (ACNTVError) | Returns a clone of this ACNTVList |
| contains (ACNTVTriplet) | Test whether an existing ACNTVTriplet element is contained in this ACNTVList |
| contains(String) | Test whether an existing ACNTVTriplet element is contained in this ACNTVList |
| copy(ACNTVList, ACNTVError) | Recursively copies the ACNTVList represented by the source argument to this ACNTVList. |
| copyElement(String, ACNTVList) | Copies the element named szName from src and inserts into this using szName as name |
| copyElement(String, ACNTVList, ACNTVError) | Copies the element named szName from src and inserts into this using szName as name |
| copyElement(String, ACNTVList, String) | Copies the element named szSrcName from src and inserts into this using szName as name |
| copyElement(String, ACNTVList, String, ACNTVError) | Copies the element named szSrcName from src and inserts into this using szName as name |
| destroy(String, ACNTVError) | Removes the ACNTVTriplet named by the name argument For ACNTVList internal use only |
| destroyTriplet(String, ACNTVError) | Removes the ACNTVTriplet named by the name argument |
| doprettyprint (StringBuffer, String, int, int) | Produces a human readable form of this ACNTVList and return it in the argument result. |
| doprettyprint (StringBuffer, String, int, int, ACNTVError) | Produces a human readable form of this ACNTVList and return it in the argument result. |
| doserialize (StringBuffer, int, ACNTVError) | Serializes this ACNTVList to a string. |
| entries() | Returns the number of elements in the ACNTVList |
| get(String) | Returns from this ACNTVList an ACNTVTriplet named by argument name. |
| getString, ACNTVError) | Returns from this ACNTVList an ACNTVTriplet named by argument name. |
| getAny(String) | Returns from this ACNTVList an ACNTVAny object named by argument name. |
| getAny(String, ACNTVError) | Returns from this ACNTVList an ACNTVAny object named by argument name. |
| getAsString(String) | Returns from this ACNTVList a String representation of argument name. |
| getAsString(String, String) | Returns from this ACNTVList a String representation of argument name. |
| getAsString (String, String, ACNTVError) | Returns from this ACNTVList a String representation of argument name. |
| getDbl(String) | Returns from this ACNTVList a double named by argument name. |
| getDbl(String, double) | Returns from this ACNTVList a double named by argument name. |
| getDbl(String, double, ACNTVError) | Returns from this ACNTVList a double named by argument name. |
| getDblArr(String) | Returns from this ACNTVList an ACNTVDblArr named by argument name. |

TABLE 11-continued

Method Index

| | |
|---|---|
| getDblArr(String, ACNTVError) | Returns from this ACNTVList an ACNTVDblArr named by argument name. |
| getInt(String) | Returns from this ACNTVList an int named by argument name. |
| getInt(String, int) | Returns from this ACNTVList an int named by argument name. |
| getInt(String, int, ACNTVError) | Returns from this ACNTVList an int named by argument name. |
| getIntArr(String) | Returns from this ACNTVList an ACNTVIntArr named by argument name. |
| getIntArr(String, ACNTVError) | Returns from this ACNTVList an ACNTVIntArr named by argument name. |
| getLastName(String, ACNTVError) | For internal use. |
| getNTVList(String) | Returns from this ACNTVList an ACNTVList named by argument name. |
| getNTVList(String, ACNTVError) | Returns from this ACNTVList an ACNTVList object named by argument name. |
| getNTVListArr(String) | Returns from this ACNTVList an ACNTVListArr named by argument name. |
| getNTVListArr(String, ACNTVError) | Returns from this ACNTVList an ACNTVListArr named by argument name. |
| getStr(String) | Returns from this ACNTVList a String named by argument name. |
| getStr(String, String) | Returns from this ACNTVList a String named by argument name. |
| getStr(String, String, ACNTVError) | Returns from this ACNTVList a String named by argument name. |
| getStrArr(String) | Returns from this ACNTVList an ACNTVStrArr named by argument name. |
| getStrArr(String, ACNTVError) | Returns from this ACNTVList an ACNTVStrArr named by argument name. |
| getTriplet(String) | Returns from this ACNTVList an ACNTVTriplet named by argument name. |
| getTriplet(String, ACNTVError) | Returns from this ACNTVList an ACNTVTriplet named by argument name. |
| getVoid(String) | Returns from this ACNTVList an opaque object named by argument name. |
| getVoid(String, ACNTVError) | Returns from this ACNTVList an opaque object named by argument name. |
| inherit(ACNTVList) | Recursively inherits elements from the ACNTVList represented by the source argument into this ACNTVList. |
| inherit(ACNTVList, ACNTVError) | Recursively inherits elements from the ACNTVList represented by the source argument into this ACNTVList. |
| insert(ACNTVTriplet, ACNTVError) | Inserts an ACNTVTriplet into the ACNTVList. |
| merge(ACNTVList) | merge(ACNTVList, ACNTVError) |
| prettyprint (StringBuffer, String, int, int, ACNTVError) | Produces a human readable form of this ACNTVList and returns it in the argument result. |
| prettyprintToDebug() | Produces human readable form of this ACNTVList and output it to the debug output stream using ArchDebug s DEBUG-APPL mode. |
| printArchDebug(int) | Produces human readable form of this ACNTVList and output it to the ArchDebug output stream using the given mode |
| remAny(String) | Removes and returns from this ACNTVList an ACNTVAnyObject named by argument name. |
| remAny(String, ACNTVError) | Removes and returns from this ACNTVList an ACNTVAnyObject named by argument name. |
| remAnyArr(String) | Removes and returns from this ACNTVList an ACNTVAnyArr named by argument name. |
| remAnyArr(String, ACNTVError) | Removes and returns from this ACNTVList an ACNTVAnyArr named by argument name. |
| remDbl(String) | Removes and returns from this ACNTVList a double int named by argument name. |
| remDbl(String, double) | Removes and returns from this ACNTVList a double named by argument name. |

TABLE 11-continued

Method Index

| | |
|---|---|
| remDbl(String, double, ACNTVError) | Removes and returns from this ACNTVList a double named by argument name. |
| remDblArr(String) | Removes and returns from this ACNTVList an ACNTVDblArr named by argument name. |
| remDblArr(String, ACNTVError) | Removes and returns from this ACNTVList an ACNTVDblArr named by argument name. |
| remInt(String) | Removes and returns from this ACNTVList an int named by argument name. |
| remInt(String, int) | Removes and returns from this ACNTVList an int named by argument name. |
| remInt(String, int, ACNTVError) | Removes and returns from this ACNTVList an int named by argument name. |
| remIntArr(String) | Removes and returns from this ACNTVLis an ACNTVIntArr named by argument name. |
| remIntArr(String, ACNTVError) | Removes and returns from this ACNTVList an ACNTVIntArr named by argument name. |
| remNTVList(String) | Removes and returns from this ACNTVList an ACNTVList named by argument name. |
| remNTVList(String, ACNTVError) | Removes and returns from this ACNTVList an ACNTVList named by argument name. |
| remNTVListArr(String) | Removes and returns from this ACNTVList an ACNTVListArr named by argument name. |
| remNTVListArr(String. ACNTVError) | Removes and returns from this ACNTVList an ACNTVListArr named by argument name. |
| remove(String) | Removes returns from this ACNTVList an ACNTVTriplet named by argument name. |
| remove(String, ACNTVError) | Removes returns from this ACNTVList an ACNTVTriplet named by argument name. |
| remStr(String) | Removes and returns from this ACNTVList a String named by argument name. |
| remstr(String, String) | Removes and returns from this ACNTVList a String named by argument name. |
| remstr(String, String, ACNTVError) | Removes and returns from this ACNTVList a String named by argument name. |
| remStrArr(String) | Removes and returns from this ACNTVList anACNTVStrArr named by argument name. |
| remstrArr(String, ACNTVError) | Removes and returns from this ACNTVList an ACNTVStrArr named by argument name. |
| remTriplet(String) | Removes and returns from this ACNTVList an ACNTVTriplet named by argument name. |
| remTriplet(String, ACNTVError) | Removes and returns from this ACNTVList an ACNTVTriplet named by argument name. |
| remVoid(String) | Removes and returns from this ACNTVList an opaque Object named by argument name. |
| remyoid(String, ACNTVError) | Removes and returns from this ACNTVListan opaque Object named by argument name. |
| remVoidArr(String) | Removes and returns from this ACNTVList an ACNTVVoidArr named by argument name. |
| remVoidArr(String, ACNTVError) | Removes and returns from this ACNTVList an ACNTVVoidArr named by argument name. |
| serialize (StringBuffer, int, ACNTVError) | Serializes this ACNTVList to a string. |
| set(ACNTVTriplet) | Places element into this ACNTVList. |
| Set(ACNTVTriplet, ACNTVError) | Places element into this ACNTVList. |
| setAny(String, ACNTVAnyObject) | Creates a new ACNTVAny element from name and value, and places it on this ACNTVList. |
| setAny(String, ACNTVAnyObject, ACNTVError) | Creates a new ACNTVAny element from name and value, and places it on this ACNTVList. |
| setAnyArr (String, ACNTVAnyArr) | Creates a new ACNTVAnyArr element from name and value, and places it on this ACNTVList. |
| setAnvArr(String, ACNTVAnyArr, ACNTVError) | Creates a new ACNTVAnyArr element from name and value, and places it on this ACNTVList. |
| setAnyArr(String, ACNTVAnyObject [], int) | Creates a new ACNTVAnyArr element from name and value, and places it on this ACNTVList. |
| setanyArr(String, ACNTVAnyObject[], int, ACNTVError) | Creates a new ACNTVAnyArr element from name and value, and places it on this ACNTVList. |
| setDbl(String, double) | Creates a new double element from name and value, and places it on this ACNTVList. |
| setDbl(String, double, ACNTVError) | Creates a new double element from name and value, and places it on this ACNTVList. |
| setDblArr(String, ACNTVDblArr) | Creates a new ACNTVDblArr element from name and value, and places it on this ACNTVList. |
| SetDblArr(String, ACNTVDblArr, ACNTVError) | Creates a new ACNTVDblArr element from name and value, and places it on this ACNTVList. |
| setDblArr(String, double[], int) | Creates a new ACNTVDblArr element from name and value, and places it on this ACNTVList. |
| setDblArr(String, double[], int, ACNTVError) | Creates a new ACNTVDblArr element from name and value, and places it on this ACNTVList. |
| setInt(String, int) | Creates a new int element from name and value, and places it on this ACNTVList. |
| setInt(String, int, ACNTVError) | Creates a new int element from name and value, and places it on this ACNTVList. |
| setIntArr(String, ACNTVIntArr) | Creates a new ACNTVIntArr element from name and value, and places it on this ACNTVList. |
| setIntArr(String, ACNTVIntArr, ACNTVError) | Creates a new ACNTVIntArr element from name and value, and places it on this ACNTVList. |
| setIntArr(String, int[], int) | Creates a new ACNTVIntArr element from name and value, and places it on this ACNTVList. |
| setIntArr(String, int[], int, ACNTVError) | Creates a new ACNTVIntArr element from name and value, and places it on this ACNTVList. |
| setNextToLast(String, ACNTVError) | For internal use. |
| setNTVList(String, ACNTVList) | Creates a new ACNTVList element from name and value, and places it on this ACNTVList. |
| setNTVList(String, ACNTVList, ACNTVError) | Creates a new ACNTVList element from name and value, and places it on this ACNTVList. |
| setNTVListArr(String) | Adds an empty NTVList array to the list with the given name |
| setNTVListArr(String, ACNTVError) | Adds an empty NTVList array to the list with the given name |
| setNTVListArr(String, ACNTVList[], int) | Creates a new ACNTVListArr element from name and value, and places it on this ACNTVList. |
| setNTVListArr(String, ACNTVList[}, int, ACNTVError) | Creates a new ACNTVListArr element from name and value, and places it on this ACNTVList. |
| setNTVListArr(String, ACNTVListArr) | Creates a new ACNTVListArr element from name and value, and places it on this ACNTVList. |
| setNTVListArr(String, ACNTVListArr, ACNTVError) | Creates a new ACNTVListArr element from name and value, and places it on this ACNTVList. |
| setNTVListRef(String, ACNTVList) | Inserts the given new ACNTVList and inserts it into this ACNTVList with the given name - no copy is made (as opposed to setNTVList(). |

TABLE 11-continued

Method Index

| | |
|---|---|
| setNTVListRef(String, ACNTVList, ACNTVError) | Inserts the given new ACNTVList and inserts it into this ACNTVList with the given name - no copy is made (as opposed to setNTVList() |
| setStr(String, String) | Creates a new String element from name and value, and places it on this ACNTVList. |
| setStr(String, String, ACNTVError) | Creates a new String element from name and value, and places it on this ACNTVList. |
| setStrArr(String, ACNTVStrArr) | Creates a new ACNTVStrArr element from name and value, and places it on this ACNTVList. |
| setStrArr(String, ACNTVStrArr, ACNTVError) | Creates a new ACNTVStrArr element from name and value, and places it on this ACNTVList. |
| setStrArr(String, String[ ], int) | Creates a new ACNTVStrArr element from name and value, and places it on this ACNTVList. |
| setStrArr(String, String[ ], int, ACNTVError) | Creates a new ACNTVStrArr element from name and value, and places it on this ACNTVList. |
| setTriplet (ACNTVTriplet) | Places an ACNTVTriplet named by argument name into this ACNTVList. |
| setTriplet (ACNTVTriplet, ACNTVError) | Places an ACNTVTriplet named by argument name into this ACNTVList. |
| setTriplet(String, ACNTVTriplet) | Searches for an element named argument name in this ACNTVList. |
| setTriplet(String, ACNTVTriplet, ACNTVError) | Searches for an element named argument name in this ACNTVList. |
| setVoid(String, Object) | Creates a new opaque Object element from name and value, and places it on this ACNTVList. |
| setVoid(String, Object, ACNTVError) | Creates a new opaque Object element from name and value, and places it on this ACNTVList. |

TABLE 12

Variables

| | |
|---|---|
| ACNTVTripletClassID | public final static int ACNTVTripletClassID |
| ACNTVIntClassID | public final static int ACNTVIntClassID |
| ACNTVStrClassID | public final static int ACNTVStrClassID |
| ACNTVVoidClassID | public final static int ACNTVVoidClassID |
| ACNTVAnyClassID | public final static int ACNTVAnyClassID |
| ACNTVRealNTVListClassID | public final static int ACNTVRealNTVListClassID |
| ACNTVNtvlClassID | public final static int ACNTVNtv1ClassID |
| ACNTVListClassID | public final static int ACNTVListclassID |
| ACNTVDblClassID | public final static int ACNTVDblClassID |
| ACNTVIntArrClassID | public final static int ACNTVIntArrClassID |
| ACNTVStrArrClassID | public final static int ACNTVStrArrClassID |
| ACNTVVoidArrClassID | public final static int ACNTVVoidArrClassID |
| ACNTVAnyArrClassID | public final static int ACNTVAnyArrClassID |
| ACNTVListArrClassID | public final static int ACNTVListArrClassID |
| ACNTVDblArrClassID | public final static int ACNTVDblArrClassID_list protected Hashtable list_listNames protected Vector listNames |

TABLE 13

CONSTRUCTORS

| | | |
|---|---|---|
| ACNTVList | public ACNTVList( ) | Constructs an empty ACNTVList object |
| ACNTVList | public ACNTVList(ACNTVList source) | Constructs an ACNTVList object based on another ACNTVList object @param source the source ACNTVList object |

TABLE 14

METHODS

| | | |
|---|---|---|
| cloneNTVList | public ACNTVList cloneNTVList(ACNTVError errval) | Returns a clone of this ACNTVlist Parameters: errval - On exit, contains status information Returns: A copy of the object |
| destroy | protectced void destroy(String name, ACNTVError errval) | Removes the ACNTVTriplet named by the name argument For ACNTVList internal use only @param name name of the ACNTVTriplet to remove @param errval On exit, contains status information |
| destroyTriplet | public void destroy Triplet(String name, ACNTError errval) | Removes the ACNTVTriplet named by the name argument @param name name of the ACNTVTriplet to remove @param errval On exit, contains status information |
| insert | public void insert (ACNTVTriplet element,ACNTVError errrval) | Inserts an ACNTVTriplet into the ACNTVList. A pre-existing triplet with the same name as element will be overwritten with element s value @param element ACNTVTriplet to insert @param |

TABLE 14-continued

METHODS

| | | |
|---|---|---|
| | | errval On exit, contains status information |
| entries | public int entries () | Returns the number of etements in the ACNTVList @return The number of elements in the ACNTVList |
| copy | public void copy(ACNTVLiSt source, ACNTVError errval) | Recursively copies the ACNTVList represented by the source argument to this ACNTVList. Elements in this list with the same name as elements in the source list are overwritten with values from the source list. @param source ACNTVList to copy from @param errval On exit, contains status information |
| inherit | public void inherit(ACNTVList source,ACNTVTError errval) | Recursively inherits elements from the ACNTVList represented by the source argument into this ACNTVList. Elements in this list with the same name as elements in the source list remain unchanged. Elements from source list whose names are not found in this list are added to this list. @param source ACNTVList to inherit from @param errval On exit, contains status information |
| inherit | public void inherit (ACNTVL source) | Recursively inherits elements from the ACNTVList represented by the source argument into this ACNTVList. Elements in this list with the same name as elements in the source list remain unchanged. Elements from source list whose names are not found in this list are added to this list. @param errval On exit, contains status information |
| contains | public boolean contains (ACNTVTriplet element) | Test whether an existing ACNTVTriplet element is contained in this ACNTVList @param element ACNTVTriplet to search for @return true element is contained in this ACNTVList, else false |
| contains | public boolean contains (String name) | Test whether an existing ACNTVTriplet element is contained in this ACNTVList @param name name of element to search for @return true if element is contained in this ACNTVList, else false |
| doserialize | public void doserialize(StringBuffer result,int code,ACNTVError errval) | Serializes this ACNTVList to a string. The code argument indicates a serialization policy. Currently, it is unused and should be set to 0. @param result contains the serialized ACNTVList @param code indicates serialization policy. @param errval On exit, contains status information |
| serialize | protected void serialize(StringBuffer result, int code, ACNTVError errval) | Serializes this ACNTVList to a string. The code argument indicates a serialization policy. Currently, it is unused and should be set to 0. This method is used internally and should not be called directly. @param result contains the serialized ACNTVList @param code indicates serialization policy. @param errval On exit, contains staus information |
| prettyprintToDebug | public void prettyprintToDebug() | Produces human readable form of this ACNTVList and output it to |

TABLE 14-continued

METHODS

| | | |
|---|---|---|
| PrintArchDebug | public void printArchDebug(int nLevel) | the debug output stream using ArchDebug s DEBUG_APPL mode. Produces human readable form of this ACNTVList and output it to the ArchDebug output stream using the given mode |
| doprettyprint | public void doprettyprint (StringBuffer result, String data, int levels, int code, ACNTVError errval | Produces a human readable form of this ACNTVList and return it in the argument result. @param result Contains the pretty printed object. @param data Prefixes each line of the output. @param code Indicates serealization policy. Currently this parameter is unused, and should be set to 0. @param levels Indicates the depth of nested ACNTVLists to include in the output. @param errval On exit, contains status information |
| doprettyprint | public void doprettyprint(StringBuffer result, String data, int levels, int code) | Produces a human readable form of this ACNTVList and return it in the argument result. No error code is returned.. @param result Contains the pretty printed object, @param data Prefixes each line of the output. @param code Indicates serialization policy. Currently this parameter is unused, and should be set to 0. @param levels Indicates the depth of nested ACNTVLists to include in the output. |
| prettyprint | protected void prettyprint(StringBuffer result, String data, int levels, Int code, ACNTVError errval) | Produces a human readable form of this ACNTVList and returns it in the argument result. This method should not be called directly. Call do ACNTVList.doprettyprint instead. @param result Contains the pretty printed object. @param data Prefixes each line of the output. @param code Indicates serialization policy. Currently this parameter is unused, and should be set to 0. @param levels Indicates the depth of nested ACNTVLists to include in the output. @param errval On exit, contains status information |
| clear | public void clear() | Removes all elements from this ACNTVList. No error code is returned. |
| clear | public void clear(ACNTVError errval) | Removes all elements from this ACNTVList. @param errval On exit, contains status information |
| getAsString | public String getAsString(string name,String defval, ACNTVError errval) | Returns from this ACNTVList a String representation of argument name. @param name The name of the value to get. @param defval The value to return if the value is not found @param errval On exit, contains status information. @return The String corresponding to the name. |
| getAsString | public String getAsString(String name, String defval) | Returns from this ACNTVList a String representation of argument name. @param name The name of the value to get. @param defval The value to return if the value is not found @return The String representation of the value corresponding to the name. |
| getAsString | public String getAsString(String name) | Returns from this ACNTVList a String representation of argument name. @param name The name |

TABLE 14-continued

METHODS

| | | |
|---|---|---|
| getStr | public String getstr(String name, String defval, ACNTVError errval) | of the value to get. @return The String representation of the value corresponding to the name. Returns from this ACNTVList a String named by argument name. @param name The name of the String to get. @param defval The value to return if the String is not found @param errval On exit, contains status information. @return The String corresponding to name. |
| getStr | public String getstr(String name, String defval) | Returns from this ACNTVList a String named by argument name. No error code is returned @param name The name of the String to get. @param defval The value to return if the String is not found @return The String corresponding to name. |
| getStr | public String getStr(String name) | Returns from this ACNTVList a String named by argument name. No error code is returned. @param name The name of the String to get. @return TheString corresponding to name. |
| getDbl | public double getDbl(String name double defval, ACNTVError errval) | Returns from this ACNTVList a double named by argument name. @param name The name of the double to get. @param defval The value to return if the double is not found @param errval On exit, contains status information. @return The double corresponding to name. |
| getDbl | public double getDbl(String name, double defval) | Returns from this ACNTVList a double named by argument name. No error code is returned. @param name The name of the double to get. @param defval The value to return if the double is not found @return The double corresponding to name. |
| getDbl | public doubie getDbl (String name) | Returns from this ACNTVLIst a double named by argument name, No error code is returned. @param name The name of the double to get. @return The double corresponding to name. |
| getInt | public int getInt(String name, int defval, ACNTVError errval) | Returns from this ACNTVList an int named by argument name. @param name The name of the int to get. @param defval The value to return if the int is not found @param errval On exit, contains status information. @return The int corresponding to name. |
| getInt | public int getInt(String name, int defval) | Returns from this ACNTVList an int named by argument name. No error code is returned. @param name The name of the int to get. @param defval The value to return if the int is not found @return The int corresponding to name. |
| getInt | public int getInt(String name) | Returns from this ACNTVList an int named by argument name. No error code is returned. @param name The name of the int to get. @return The int corresponding to name. |
| getVoid | public Object getVoid(String name, ACNTVError errval) | Returns from this ACNTVList an opaque object named by argument name. These objects cannot be serialized or pretty- |

TABLE 14-continued

METHODS

| | | |
|---|---|---|
| | | printed. @param name The name of the opaque object to get. @param errval On exit, contains status information. @return The opaque object corresponding to name. |
| getVoid | public Object getVoid(String name) | Returns from this ACNTVList an opaque object named by argument name. These objects cannot be serialized or pretty-printed. No error code is returned. @param name The name of the opaque object to get. @return The opaque object corresponding to name. |
| geAny | public ACNTVAnyObject getAny(String name, ACNTVError errval) | Returns from this ACNTVList an ACNTVAny object named by argument name. The value returned is an object which implements the ACNTVAnyObject interface. @param name The name of the ACNTVAnyObject to get. @param errval On exit, contains status information. @return The ACNTVAnyObject corresponding to name. @see ACNTVAnyObject |
| getAny | public ACNTVAnyObject getAny{String name) | Returns from this ACNTVList an ACNTVAny object named by argument name. The value returned is an object which implements the ACNTVAnyObject interface. No error code is returned. @param name The name of the ACNTVAnyObject to get. @return The ACNTVAnyObject corresponding to name. @see ACNTVAnyObject |
| getNTVList | public ACNTVList getNTVList(String name, ACNTVError errval) | Returns from this ACNTVList an ACNTVList object named by argument name. @param name The name of the ACNTVList to get. @param errval On exit, contains status information, @return The ACNTVList corresponding to name. @see ACNTVListObject |
| getNTVList | public ACNTVList getNTVList(String name) | Returns fromthis ACNTVList an ACNTVList named by argument name. @param name The name of the ACNTVList to get. @return The ACNTVList corresponding to name @see ACNTVList |
| getIntArr | public ACNTVIntArr getIntArr(String name, ACNTVError errval) | Returns from this ACNTVList an ACNTVIntArr named by argument name. @param name The name of the ACNTVIntArr to get. @param errvat On exit, contains status information. @return The ACNTVIntArr corresponding to name. @see ACNTVIntArr |
| getIntArr | public ACNTVIntArr getIntArr(String name) | Returns from this ACNTVList an ACNTVIntArr named by argument name. No error code is returned. @param name The name of the ACNTVIntArr to get. @return The ACNTVIntArr corresponding to name. @see ACNTVIntArr |
| getStrArr | public ACNTVStrArr getStrArr(String name.ACNTVError errval) | Returns from this ACNTVList an ACNTVStrArr named by argument name. @param name The name of the ACNTVStrArr to get. @param. errval On exit, |

TABLE 14-continued

METHODS

| | | |
|---|---|---|
| getStrArr | public ACNTVStrArr getStrArr(String name) | contains status information. @return The ACNTVStrArr corresponding to name. @see ACNTVStrArr<br>Returns from this ACNTVList an ACNTVStrArr named by argument name. No error code is returned. @param name The name of the ACNTVStrArr to get. @return The ACNTVStrArr corresponding to name. @see ACNTVStrArr |
| getDblArr | public ACNTVDblArr getDblArr (String name, ACNTVError errval) | Returns from this ACNTVList an ACNTVDblArr named by argument name. @param name The name of the ACNTVDblArr to get. @param errval On exit, contains status information. @return The ACNTVDblArr corresponding to name. @see ACNTVDblArr |
| getDblArr | public ACNTVDblArr getDblArr(String name) | Returns from this ACNTVList an ACNTVDblArr named by argument name. No error code is returned. @param name The name of the ACNTVDblArr to get @return The ACNTVDblArr corresponding to name. @see ACNTVDblArr |
| ACNTVgetVoid Arr | public ACNTVVoidArr ACNTVgetVoidArr (String name, ACNTVError errval) | Returns from this ACNTVList an ACNTVVoidArr named by argument name. @param name The name of the ACNTVVoidArr to get. @param errval On exit, contains status information. @return The ACNTVVoidArr corresponding to name. @see ACNTVVoidArr |
| ACNTVgetVoid Arr | public ACNTVVoidArr ACNTVgetVoidArr(String name) | Returns from this ACNTVList an ACNTVVoidArr named by argument name. No error code is returned. @param name The name of the ACNTVVoidArr to get. @return The ACNTVVoidArr corresponding to name. @see ACNTVVoidArr |
| ACNTVgetAny Arr | public ACNTVAnyArr ACNTVgetAnyArr(String name, ACNTVError errval) | Returns from this ACNTVList an ACNTVAnyArr named by argument name. @param name The name of the ACNTVAnyArr to get. @param errval On exit, contains status information. @return The ACNTVAnyArr corresponding to name. @see ACNTVAnyArr |
| ACNTVgetAny Arr | public ACNTVAnyArr ACNTVgetAnyArr(String name) | Returns from this ACNTVList an ACNTVAnyArr named by argument name. No error code is returned. @param name The name of the ACNTVAnyArr to get. @return The ACNTVAnyArr corresponding to name. @see ACNTVAnyArr |
| getNTVListArr | public ACNTVListArr getNTVListArr (String name, ACNTVError errval) | Returns from this ACNTVList an ACNTVListArr named by argument name. @param name The name of the ACNTVListArr to get. @param errval On exit, contains status information. @return The ACNTVListArr corresponding to name. @see ACNTVListArr |
| getNTVListArr | public ACNTVListArr getNTVListArr(String name) | Returns from this ACNTVList an ACNTVListArr named by argument name. No error code is returned. @param name The name of the ACNTVListArr to get. |

TABLE 14-continued

METHODS

| | | |
|---|---|---|
| get | protected ACNTVTriplet get(String name, ACNTVError errval) | @return The ACNTVListArr corresponding to name. @see ACNTVListArr Returns from this ACNTVList an ACNTVTriplet named by argument name. For internal use only, Dont call directly. @param name The name of the ACNTVTriplet to get. @param errval On exit, contains Status information. @return The ACNTVTriplet corresponding to name. @see ACNTVTriplet |
| get | protected ACNTVTriplet get(String name) | Returns from this ACNTVList an ACNTVTriplet named by argument name. For internal use only. Don t call directly. No error code is returned. @param name The name of the ACNTVTriplet to get. @return The ACNTVTriplet corresponding to name. @see ACNTVTriplet |
| getTriplet | public ACNTVTriplet getTriplet(String name, ACNTVError errval) | Returns from this ACNTVList an ACNTVTriplet named by argument name. Dotted names are supported. For example, getTriplet( a.b.c.d , errval) will return the ACNTVTriplet named d from the nested ACNTVList a.b.c, in which a contains b contains c. @param name The name of the ACNTVTriplet to get. @param errval On exit, contains status information. @return The ACNTVTriplet corresponding to name. @see ACNTVTriplet |
| getTriplet | public ACNTVTriplet getTriplet(String name) | Returns from this ACNTVList an ACNTVTriplet named by argument name. Dotted names are supported. For example, getTriplet( a.b.c.d , errval) will return the ACNTVTriplet named d from the nested ACNTVLists a, b, and c. No error code is returned. @param name The name of the ACNTVTriplet to get. @return The ACNTVTriplet corresponding to name. @see ACNTVTriplet |
| remStr | public String remStr(String name, String defval, ACNTVError errval) | Removes and returns from this ACNTVList a String named by argument name. @param name The name of the String to remove. @param defval The value to return if the String is not found @param errval On exit. contains Status information. @return The String which was removed @see |
| remStr | public String remStr(String name, String defval) | Removes and returns from this ACNTVList a String named by argument name. No error code is returned. @param name The name of the String to remove. @param defval The value to return if the String is not found @return The String which was removed |
| remStr | public String remStr(String name) | Removes and returns from this ACNTVList a String named by argument name. No error code is returned. @param name The name of the String to remove. @return The String which was removed |

TABLE 14-continued

METHODS

| | | |
|---|---|---|
| remDbl | public double remDbl(String name, double defval, <u>ACNTVError</u> <u>errval)</u> | Removes and returns from this ACNTVList a double named by argument name. @param name The name of the double to remove. @param defval The value to return if the double is not found @param errval On exit, contains Status information. @return The double int which was removed |
| remDbl | public double remDbl(String name, double defval) | Removes and returns from this ACNTVList a double int named by argument name. No error code is returned. @param name The name of the double to remove. @param defval The value to return if the double is not found @return The double int which was removed |
| remDbl | public double remDbl(<u>String</u> name) | ves and returns from this ACNTVList a double int named by argument name. No error code is returned. @param name The name of the double to remove. @return The double int which was removed |
| remInt | public int remInt(String name, int defval, <u>ACNTVError</u> errval) | Removes and returns from this ACNTVList an int named by argument name. @param name The name of the int to remove. @param defval The value to return if the int is not found @param errvall On exit, contains status information. @return The int which was removed |
| remInt | public int remInt(String name, int defval) | Removes and returns from this ACNTVList an int named by argument name. No error code is retured. @param name The name of the int to remove. @param defval The value to return if the int is not found @return The int which was removed |
| remInt | public int remInt(String name) | Removes and returns from this ACNTVList an int named by argument name. No error code is required, @param name The name of the int to remove, @return The int which was removed |
| rem Void | public <u>Object</u> remVoid(String name, <u>ACNTVError</u> errval) | Removes and returns from this ACNTVList an opaque Object named by argument name, @param name The name of the opaque Object to remove @param errval On exit, contains status information. @return The opaque Object which was removed |
| remVoid | public <u>Object</u> remVoid(String name) | Removes and returns from this ACNTVList an opaque Object named by argument name. No error code is returned. @param name The name of the opaque Object to remove. @return The opaque Object which was removed |
| remAny | public <u>ACNTVAnyObject</u> remAny(String name, <u>ACNTVError</u> errval) | Removes and returns from this ACNTVList an ACNTVAnyObject named by argument name @param name The name of the ACNTVAnyObject to remove. @param errval On exit, Contains status information @return The ACNTVAnyObject which was removed |

TABLE 14-continued

METHODS

| | | |
|---|---|---|
| remAny | public <u>ACNTVAnyObject</u> remAny(String name) | Removes and returns from this ACNTVList an ACNTVAnyObject named by argument name. No error code is returned. @param name The name of the ACNTVAnyobject to remove. @return The ACNTVAnyObject which was removed |
| remNTVList | public <u>ACNTVList.</u> remNTVList(String name, <u>ACNTVError</u> errval) | Removes and returns from this ACNTVList an ACNTVList named by argument name. @param name The name of the ACNTVList to remove. @param errval On exit, contains Status information. @return The ACNTVList which was removed |
| remNTVList | public <u>ACNTVList</u> remNTVList(String name) | Removes and returns from this ACNTVList an ACNTVList named by argument name. No error code is returned. @param name The name of the ACNTVList to remove. @return The ACNTVList which was removed |
| remIntArr | public <u>ACNTVIntArr</u> remIntArr(String name, <u>ACNTVError</u> errval) | Removes and returns from this ACNTVList an ACNTVIntArr named by argument name. @param name The name of the ACNTVIntArr to remove. @param errval On exit, contains status information. @return The ACNTVIntArr which was removed |
| remIntArr | public <u>ACNTVInArr</u> remIntArr (String name) | Removes and returns from this ACNTVList an ACNTVIntArr named by argument name. No error code is returned. @param name The name of the ACNTVIntArr to remove. @return The ACNTVIntArr which was removed |
| remStrArr | public <u>ACNTVStrArr</u> remstrArr(String name, <u>ACNTVError</u> errval) | Removes and returns from this ACNTVList an ACNTVStrArr named by argument name. @param name The name of the ACNTVStrArr to remove. param errval On exit, contains status information. @return The ACNTVStrArr which was removed. |
| remstrArr | public <u>ACNTVStrArr</u> remstrArr(String name) | Removes and returns from this ACNTVList an ACNTVStrArr named by argument name. No error code is returned. @param name The name of the ACNTVStrArr to remove. @return The ACNTVStrArr which was removed |
| remDblArr | public <u>ACNTVDblArr</u> remDblArr(String name, <u>ACNTVError</u> errval) | Removes and returns from this ACNTVList an ACNTVDblArr named by argument name. @param name The name of the ACNTVDblArr to remove. @param errval On exit, contains status information. @return The ACNTVDblArr which was removed |
| remDblArr | public <u>ACNTVDblArr</u> remDblArr(String name) | Removes and returns from this ACNTVList an ACNTVDblArr named by argument name. No error code is returned. @param name The name of the ACNTVDblArr to remove. @return The ACNTVDblArr which was removed |
| rem VoidArr | public ACNTVVoidArr remVoidArr(String name, ACNTVError errval) | Removes and returns from this ACNTVList an ACNTVVoidArr named by argument name. @param name The name of the |

TABLE 14-continued

| METHODS | | |
|---|---|---|
| rem VoidArr | public ACNTVVoidArr remVoidArr(String name) | ACNTVVoidArr to remove. @param errval On exit, contains status information. @return The ACNTVVoidArr which was removed<br>Removes and returns from this ACNTVList an ACNTVVoidArr named by argument name. No error code is returned. @param name The name of the ACNTVVoidArr to remove. @return The ACNTVVoidArr which was removed |
| remAnyArr | public ACNTVAnyArr remAnyArr (String name, ACNTVError errval) | Removes and returns from this ACNTVList an ACNTVAnyArr named by argument name. ¤param name The name of the ACNTVAnyArr to remove, @param errval On exit, contains status information. @return The ACNTVAnyArr which was removed |
| remAnyArr | public ACNTVAnyArr remAnyArr(String name) | Removes and returns from this ACNTVList an ACNTVAnyArr named by argument name. No error code is returned. @param name The name of the ACNTVAnyArr to remove. @return The ACNTVAnyArr which was removed |
| remNTVListArr | public ACNTVListArr remNTVListArr(String name, ACNTVError errval) | Removes and returns from this ACNTVList an ACNTVListArr named by argument name. @param name The name of the ACNTVListArr to remove. @param errval On exit, contains status information. @return The ACNTVListArr which was removed |
| remNTVListArr | public ACNTVListArr remNTVListArr(String name) | Removes and returns from this ACNTVList an ACNTVListArr named by argument name. No error code is returned. @param name The name of the ACNTVListArr to remove. @return The ACNTVListArr which was removed |
| remTriplet | public ACNTVTriplet remTriplet(String name, ACNTVError errval) | Removes and returns from this ACNTVList an ACNTVTriplet named by argument name. Dotted names are supported. For example. getTriplet( a.b.c.d, errval) will return the ACNTVTriplet named d from the nested ACNTVLists a , b, and c. @param name The name of the ACNTVTriplet to remove. @param errval On exit, contains status information. @return The ACNTVTriplet which was removed @see ACNTVTriplet |
| remTriplet | public ACNTVTriplet remTriplet(String name) | Removes and returns from this ACNTVList an ACNTVTriplet named by argument name. Dotted names are supported. For example, getTriplet( a.b.c.d, errval) will return the ACNTriplet named d from the nested ACNTVLists a, b, and c. No error code is returne Triplet. @param name The name of the ACNTVTriplet to remove. @return The ACNTVTriplet which was removed @see ACNTVTriplet |

TABLE 14-continued

| METHODS | | |
|---|---|---|
| remove | public ACNTVTriplet remove(String name, ACNTVError errval) | Removes returns from this ACNTVList an ACNTVTriplet named by argument name. For internal use only, Don t call directly. @param name The name of the ACNTVTriplet to remove. @param errval On exit, contains status information. @return The ACNTVTriplet which was removed. @see ACNTVTriplet |
| remove | public ACNTVTriplet remove(String name) | Removes returns from this ACNTVList an ACNTVTriplet named by argument name. For internal use only, Don t call directly. No error code is returned. @param name The name of the ACNTVTriplet to remove. @return The ACNTVTriplet which was removed. @see ACNTVTriplet |
| setTriplet | public void setTriplet(ACNTVTriplet element, ACNTVError errval) | Places an ACNTVTriplet named by argument name into this ACNTVList. Dotted names are supported. For example, setTriplet( a.b.c, element, errval) will place the element in the nested ACNTVList a.b.c, in which a contains b contains c. The value of a pre-existing element with the same name as element will be replaced. @param element The ACNTVTriplet to set. @param errval On exit, contains status information. @see ACNTVTriplet |
| setTriplet | public void setTriplet(ACNIVTriplet element) | Places an ACNTVTriplet named by argument name into this ACNTVList. Dotted names are supported. For example, setTriplet( a.b.c, element, errval) will place the element in the nested ACNTVList a.b.c, in which a contains b contains c. The value of a pre-existing element with the same name as element will be replaced. No error code is returned, @param element The ACNTVTriplet to set. @see ACNTVTriplet |
| setTriplet | public void SetTriplet(String name, ACNTVTriplet element, ACNTVError errval) | Searches for an element named argument name in this ACNTVList. If found, replaces the value with element s value, otherwise, a new ACNTVList is created, element is placed on the new ACNTVList, and the new ACNTVList is placed on this ACNTVList. @param name Name of the ACNTVTriplet to find @param element The ACNTVTriplet to set. @param errval On exit, contains status information. @see ACNTVTriplet |
| setTriplet | public void setTriplet(String name, ACNTVTriplet element) | Searches for an element named argument name in this ACNTVList. If found, replaces the value with element s value, otherwise, a new ACNTVList is created, element is placed on the new ACNTVList, and the new ACNTVList is placed on this ACNTVList. No error code returned. @param name. Name of the ACNTVTriplet to find @param element The ACNTVTriplet to set. @See |

TABLE 14-continued

METHODS

| | | |
|---|---|---|
| getLastName | protected String getLastName (String name, ACNTVError errval) | ACNTVTriplet For internal use. Used to find the last name in a list of possible of dotted names. |
| setNextToLast | protected ACNTVList setNextToLast(String name, ACNTVError errval) | For internal use. Used on dotted names to find the list containing the last segment of the dotted name. @param. name Dotted name to search for in this ACNTVList @param tastname StringBuffer containing the last segment of of the dotted name. @return The parent ACNTVList of the last segment of the dotted name. @see |
| set | protected void set(ACNTVTriplet element, ACNTVError errval) | Places element into this ACNTVList. For internal use only. Do not call directly. @param element The ACNTVTriplet to pface. @param errval On exit, contains status information. |
| set | protected void set (ACNTVTriplet element) | Places element into this ACNTVList. For internal use only. Do not call directly. No error code is returned. @param element The ACNTVTriplet to place on this ACNTVList. |
| copyElement | public void copyElement (String szName, ACNTVList src) | Copies the element named szName from src and inserts into this using szName as name |
| copyElement | public void copyElement(String szName, ACNTVList src, ACNTVError errval) | Copies the element named szName from src and inserts into this using szName as name |
| copyElement | public void copyElement (String szName, ACNTVList, String szScrName) | Copies the element named szSrcName from src and inserts into this using szName as name |
| copyElement | public void copyElement(String szName, ACNTVList src, String szSrcName, ACNTVError errval) | Copies the element named szSrcName from src and inserts into this using szName as name |
| setStr | public Void setStr (9String name, String value, ACNTVError errval) | Creates a new String element from name and value, and places it on this ACNTVList. @param name The name of the new String element @param value The value of the new String element @param errval On exit, contains status information. |
| setStr | public void setStr(String name, String value) | Creates a new String element from name and value, and places it on this ACNTVList. No error code is returned. @param name The name of the new String element @param value The value of the new String element |
| setDbl | public void setDbl (String name, double value, ACNTVError errval) | Creates a new double element from name and value, and places it on this ACNTVList. @param name The name of the new double element @param value The value of the new double etement @param errval On exit, contains status information. |
| setDbl | public void setDbl(String name, double value) | Creates a new double element from name and value, and places it on this ACNTVList. No error code is returned. @param name The name of the new double element @param value The value of the new double element |
| setInt | public void setInt (Stringname. int value, ACNTVError errval) | Creates a new int element from name and value, and places it on this ACNTVList @param name The name of the new int element @param value The value of the new int element @param errval On exit, contains status information. |

TABLE 14-continued

| METHODS | | |
|---|---|---|
| setInt | public void setInt (String name, int value) | Creates a new int element from name and value, and places it on this ACNTVList. No error code is returned. @param name The name of the new int element @param value The value of the new int element |
| setVoid | public void setVoid(String name, Object values, ACNTVError errval) | Creates a new opaque Object element from name and value, and places it on this ACNTVList. @param name The name of the new opaque Object element @param value The value of the new opaque Object element at @param errval On exit, contains status information. |
| set Void | public void setVoid(String name, Object value) | Creates a new opaque Object element from name and value, and places it on this ACNTVList. No error code is returned @param name The name of the new opaque Object element @param value The value of the new opaque Qbject element |
| setAny | public Void setAny(String named, ACNTVAnyObject pValue,. ACNTVError errval) | Creates a new ACNTVAny element from name and value, and places it on this ACNTVList. @param name The name of the new ACNTVAny element @param yalue The value of the new ACNTVAny element @param errval On exit, contains Status information. |
| setAny | public void setAny(String name, ACNTVAnyObject value) | Creates a new ACNTVAny element from name and value, and places it on this ACNTVList. No error code is returned. @param name The name of the new ACNTVAny element @param value The value of the new ACNTVAny element |
| setNTVListRef | public void setNTVListRef(String name, ACNTVList value, ACNTVError errval) | Inserts the given new ACNTVList and inserts it into this ACNTVList with the given name - no copy is made (as opposed to setNTVList() @param name The name of the new ACNTVList element @param value The value of the new ACNTVList element @param errval On exit, contains status information. |
| setNTVListRef | public void setNTVListRef (String name, ACNTVList value) | Inserts the given new ACNTVList and inserts it into this ACNTVList with the given name - no copy is made (as opposed to setNTVList(). No error code is returned. @param name The name of the new ACNTVList element @param value The value of the new ACNTVList element |
| setNTVList | public void setNTVList (String name, ACNTVList value, ACNTVError errval) | Creates a new ACNTVList element from name and value, and places it on this ACNTVList. @param. name The name of the new ACNTVList element @param value The value of the new ACNTVList element @param errval On exit, contains status information. |
| setNTVList | public void setNTVList(String name, ACNTVList value) | Creates a new ACNTVList element from name and value, and place it on this ACNTVList. No error code is returned @param name The name of the new ACNTVList element |

TABLE 14-continued

METHODS

| | | |
|---|---|---|
| setIntArr | public void setIntArr (String name, int array[], int length, ACNTVError errval) | @param value The value of the new ACNTVList element<br>Creates a new ACNTVIntArr element from name and value, and places it on this ACNTVList. @param name The name of the new ACNTVIntArr element @param value The int array used to construct the new ACNTVIntArr element @param errval On exit, contains status information. |
| setIntArr | public void setIntArr(String name, int array[], int length) | Creates a new ACNTVIntArr element from name and value, and places it on this ACNTVList. No error code is returned. @param name The name of the new ACNTV IntArr element @param value The int array used to construct the new ACNTVIntArr element |
| setIntArr | public void setIntArr(String name,ACNTVIntArr array,ACNTVError errval) | Creates a new ACNTVIntArr element from name and value, and places it on this ACNTVList. @param name The name of the new ACNTVIntArr element @param value The value of the new ACNTVIntArr element @param errval On exit,contains status information. |
| setIntArr | public void setIntArr(String name, ACNTVIntArr array) | Creates a new ACNTVIntArr element from name and value, and places it on this ACNTVList. @param name The name of the new ACNTVIntArr element @param value The value of the new ACNTVIntArr element @param errval On exit, contains status information. |
| setStrArr | public void setStrArr(String name,String array[], int length, ACNTVError errval) | Creates a new ACNTVStrArr element from name and value, and places it on this ACNTVList. @param name The name of the new ACNTVStrArr element @param value The String array used to construct the new ACNTVStrArr element @param errval On exit, contains status information. |
| setStrArr | public void setStrArr(String name,String array[] int length) | Creates a new ACNTVStrArr element from name and value, and places it on this ACNTVList. No error code is returned. @param name The name of the new ACNTVStrArr element @param value The String array used to construct the new ACNTVStrArr element |
| setStrArr | public Void setStrArr(String name, ACNTVStrArr array, ACNTVError errval) | Creates a new ACNTVStrArr element from name and value, and places it on this ACNTVList. @param name The name of the new ACNTVStrArr element @param value The value of the new ACNTVStrArr element @param errval On exit, contains status information. |
| setStrArr | public void setStrArr(String name, ACNTVStrArr array) | Creates a new ACNTVStrArr element from name and value, and places it on this ACNTVList. No error code is returned. @param name The name of the new ACNTVStrArr element @param value The value of the new ACNTVStrArr element |

TABLE 14-continued

METHODS

| | | |
|---|---|---|
| setDblArr | public voidsetDblArr(String name,double array[ ], int length, ACNTVError errval) | Creates a new ACNTVDblArr element from name and value, and places it on this ACNTVList. @param name The name of the new ACNTVDblArr element @param value The double array used to construct the new ACNTVDblArr element @param errval On exit, contains status information. |
| setDblArr | public void setDblArr(String name, double array[], int length) | Creates a new ACNTVDblArr element from name and value, and places it on this ACNTVList. No error value is returned. @param name The name of the new ACNTVDblArr element @param value The double array used to construct the new ACNTVDblArr element |
| setDblArr | public void setDblArr(String name, ACNTVTDblArr array, ACNTVError errval) | Creates a new ACNTVDblArr element from name and value, and places it on this ACNTVList. @param name The name of the new ACNTVDblArr element @param value The value of the new ACNTVDblArr element @param errval On exit, contains status information. |
| setDblArr | public void setDblArr(String name, ACNTVDblArr array) | Creates a new ACNTVDblArr element from name and value, and places it on this ACNTVList. No error value is returned. @param name The name of the new ACNTVDblArr element @param value The value of the new ACNTVDblArr element |
| setAnyArr | public void setAnyArr(String name, ACNTVAnyobject array [ ], int length, ACNTVError errval) | Creates a new ACNTVAnyArr element from name and value, and places it on this ACNTVList. @param name The name of the new ACNTVAnyArr element @param value The ACNTVAnyObject array used to construct the new ACNTVAnyArr element @param errval On exit, contains status information. |
| setAnyArr | public void setAnyArr(String name, ACNTVAnyObject array [], int length) | Creates a new ACNTVAnyArr element from name and value, and places it on this ACNTVList. No error code is returned. @param name The name of the new ACNTVAnyArr element @param value The ACNTVAnyObject array used to construct the newACNTVAnyArr element |
| setAnyArr | public void setAnyArr(String name, ACNTVAnyArr array [], ACNTVError errval) | Creates a new ACNTVAnyArr element from name and value, and places it on this ACNTVList. @param name The name of the new ACNTVAnyArr element @param value The value of the new ACNTVAnyArr element @param errval On exit, contains status information. |
| setAnyArr | public void setAnyArr(String name, ACNTVAnyArr array) | Creates a new ACNTVAnyArr element from name and value, and places it on this ACNTVList. No error code is returned. @param name The name of the new ACNTVAnyArr element @param value The value of the new ACNTVAnyArr element |
| setNTVListArr | public void setNTVListArr (String name) | Adds an empty NTVList array to the list with the given name @param name The name of the new ACNTVListArr element |

TABLE 14-continued

| METHODS | | |
|---|---|---|
| setNTVListArr | public void setNTVListArr(String name, ACNTVError errval) | Adds an empty NTVList array to the list with the given name @param name The name of the new ACNTVListArr element @param errval On exit, contains status information. |
| setNTVListArr | public void setNTVListArr(String name, ACNTVList array[] int length, ACNTVError errval) | Creates a new ACNTVListArr element from name and value, and places it on this ACNTVList @param name The name of the new ACNTVListArr element @param value The ACNTVList array used to construct the newACNTVListArr element @param errval On exit, contains status information. |
| setNTVListArr | public void setNTVListArr(String name, ACNTVList array[], int length) | Creates a new ACNTVListArr element from name and value, and places it on this ACNTVList. No error code is returned. @param name The name of the new ACNTVListArr element @param value The ACNTVList array used to construct the newACNTVListArr element |
| setNTVListArr | public void setNTVListArr(String name, ACNTVListArr array, ACNTVError errval) | Creates a new ACNTVListArr element from name and value, and places it on this ACNTVList. @param name The name of the new ACNTVListArr element @param value The value of the new ACNTVListArr element @param errval On exit, contains status information. |
| setNTVListArr | public void NTVListArr(String name, ACNTVListArr array) | Creates a new ACNTVListArr element from name and value, and places it on this ACNTVList. No error code is returned. @param name The name of the new ACNTVListArr element @param value The value of the new ACNTVListArr element |
| merge | public void merge (ACNTVList ntvMerge, ACNTVError errval) | |
| merge | public void merge(ACNTVList ntvMerge) | |
| castToNTVList | public ACNTVList castToNTVList() | Safe downcast from ACNTVTriplet to ACNTVList @return ACNTVList, or null if this is not an ACNTVList |

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for storing data for use in applications which reside within an electronic network, comprising the steps of:
providing a storage triplet comprising a storage element for the name of a variable; a storage element for a type indicator; and a storage element for value storage;
storing a variable name in said name storage element;
storing a type indicator in said type indicator storage element;
storing a value in said value storage element in said triplet in accordance with the type indicator stored in the type indicator storage element of said triplet;
wherein said value storing step stores said value in the resident platform's machine-dependent representation; and
wherein data may be represented on dissimilar platforms by storing said triplet in a self describing format.

2. The method of claim 1, wherein said type indicator can be any of the following: integer, a floating point number, a string, an array, or an another said triplet.

3. The method of claim 1, wherein said value is stored according to an internal storage format of a resident platform.

4. The method of claim 1, further comprising the step of:
storing characters in a value portion of said triplet.

5. The method of claim 1, wherein said triplet value is serialized into a string which may be transmitted from a resident platform and reconstituted at a remote platform in the same format and the same structure as at said resident platform.

6. The method of claim 1, wherein one or more of said triplets can be embedded within other said triplets.

7. The method of claim 1, further comprising the step of:
providing at least one triplet set function for setting a value into a triplet list.

8. The method of claim 7, wherein said set function has the following format:

ACNTVList::set<TypeSpecifier>(String<name>, NativeType<value>[, ACNTVError<error object>]);.

9. The method of claim 7, wherein parameters to said set function comprise a name with which said set value is associated, a value to insert as a correct native type, and an optional error object that may be populated with a return condition code.

10. The method of claim 1, further comprising the steps of:

providing a triplet list hierarchy; and using dot notation to specify a name that is one or more levels into said triplet list hierarchy.

11. The method of claim 1, further comprising the step of:

inserting date/time values into said triplet using a native date/time representation.

12. The method of claim 1, further comprising the step of:

inserting date/time values into said triplet in a native format using a string and a corresponding format that describes said value.

13. The method of claim 1, further comprising the step of:

inserting Boolean operators into said triplet in a native format.

14. The method of claim 1, further comprising the step of:

getting a value from said triplet using a get function having parameters that include a name associated with a desired value, an optional default value in a native format, and an optional error object that is populated with a return condition code, if appropriate.

15. The method of claim 1, further comprising the step of:

converting a value to a string before said value is returned.

16. The method of claim 1, further comprising the step of:

providing a corresponding array type for each base type, wherein said array type comprises objects which handle memory management.

17. The method of claim 1, further comprising the step of:

providing at least one iterator class having a single constructor that takes as a parameter a pointer to a triplet list.

18. The method of claim 17, further comprising the step of:

stepping through said triplet list after constructing an iterator to return the name of the item in said triplet list.

19. The method of claim 17, further comprising the steps of:

determining the type of element by calling a get type method; and comparing a result obtained to a constant to operate on data in said triplet list.

20. The method of claim 19, further comprising the steps of:

getting element data after determining said type by retrieving said data using get methods.

21. The method of claim 1, further comprising the step of:

providing a method that returns a triplet used internally to store data.

22. The method of claim 1, further comprising the step of:

providing an iterator class-that supports a reset method which restores the state an iterator to that which said iterator had immediately after construction.

23. An apparatus for storing data for use in applications which reside within an electronic network, comprising:

a memory; and a plurality of storage triplets stored within said memory each comprising a storage element for the name of a variable; a storage element for a type indicator; and a storage element for value storage;

a variable storage unit that receives a variable name, a variable type indicator and a value and stores said variable name, type indicator and value in the corresponding storage elements in one of said triplets;

wherein said value is stored in said value storage element in said triplet in accordance with the type indicator received;

wherein said value storing step stores said value in the resident platform's machine-dependent representation; and wherein data may be represented on dissimilar platforms by storing said triplets in a self describing format.

24. The apparatus of claim 23, wherein said type indicator can be any of the following: an integer, a floating point number, a string, an array, or an another said triplet.

25. The apparatus of claim 23, wherein said value is stored accordance to an internal storage format of a resident platform.

26. The apparatus of claim 23, wherein characters are stored in a value portion of said triplet.

27. The apparatus of claim 23, wherein said triplet value is serialized into a string which may be transmitted from a resident platform and reconstituted at a remote platform in the same format and the same structure as at said resident platform.

28. The apparatus of claim 23, wherein one or more of said triplets can be embedded within other said triplets.

29. The apparatus of claim 23, further comprising:

at least one triplet set function for setting a value into a triplet list.

30. The apparatus of claim 29, wherein said set function has the following format:

ACNTVList::set<TypeSpecifier>(String<name>, NativeType<value>[, ACNTVError<error object>]);.

31. The apparatus of claim 29, wherein parameters to said set function comprise a name with which said set value is associated, a value to insert as a correct native type, and an optional error object that may be populated with a return condition code.

32. The apparatus of claim 23, further comprising:

a triplet list hierarchy; and dot notation for specifying a name that is one or more levels into said triplet list hierarchy.

33. The apparatus of claim 23, further comprising:

means for inserting date/time values into said triplet using a native date/time representation.

34. The apparatus of claim 23, further comprising:

means for inserting date/time values into said triplet in a native format using a string and a corresponding format that describes said value.

35. The apparatus of claim 23, wherein Boolean operators are inserted into said triplet in a native format.

36. The apparatus of claim 23, further comprising the step of:

means for getting a value from said triplet using a get function having parameters that include a name associated with a desired value, an optional default value in a native format, and an optional error object that is populated with a return condition code, if appropriate.

37. The apparatus of claim 23, wherein a value is converted to a string before said value is returned.

38. The apparatus of claim 23, further comprising the step of:
- a corresponding array type for each base type, wherein said array type comprises objects which handle memory management.

39. The apparatus of claim 23, further comprising:
- at least one iterator class having a single constructor that takes as a parameter a pointer to a triplet list.

40. The apparatus of claim 39, further comprising:
- means for stepping through said triplet list after constructing an iterator to return the name of the item in said triplet list.

41. The apparatus of claim 39, further comprising:
- means for determining the type of element by calling a get type method; and
- means for comparing a result obtained to a constant to operate on data in said triplet list.

42. The apparatus of claim 41, further comprising the steps of:
- getting element data after determining said type by retrieving said data using get methods.

43. The apparatus of claim 23, further comprising:
- a method that returns a triplet used internally to store data.

44. The apparatus of claim 23, further comprising:
- an iterator class that supports a reset method which restores the state an iterator to that which said iterator had immediately after construction.

* * * * *